United States Patent [19]
Shiga et al.

[11] 3,749,817
[45] July 31, 1973

[54] INSULATED CABLE HAVING STRAND SHIELDING SEMI-CONDUCTIVE LAYER

[75] Inventors: Tetsuya Shiga; Yutaka Inagaki; Hironaga Matsubara, all of Osaka, Japan

[73] Assignee: Sumitomo Electric Industires, Ltd., Higashi-ku, Osaka, Japan

[22] Filed: Dec. 22, 1971

[21] Appl. No.: 211,072

[30] Foreign Application Priority Data
Dec. 28, 1970 Japan.............................. 45/24503

[52] U.S. Cl.174/102 SC, 174/110 AR, 174/110 PM, 174/120 SC
[51] Int. Cl............................ H01b 3/30, H01b 7/02
[58] Field of Search............... 174/102 SC, 105 SC, 174/106 SC, 120 SC, 120 R, 120 AR, 120 SR, 110 PM, 110 AR, 110 SR, 126 R, 127, 36; 117/215, 216, 230, 231, 232

[56] References Cited
UNITED STATES PATENTS
3,262,988  7/1966  Joyce.............................. 117/232 X
3,375,303  3/1968  Joyce.............................. 117/232 X
3,565,694  2/1971  Chireau.......................... 117/216 X
3,617,377  11/1971 Isshiki et al..................... 117/232 X
3,643,004  2/1972  McKean........................ 174/110 PM
3,649,542  3/1972  Hasebe et al. ................ 174/110 PM
3,671,663  6/1972  Seifert........................... 174/110 PM
3,644,662  2/1972  Salahshourian................. 174/127 X
3,517,086  6/1970  Shirayama et al. .......... 174/110 PM
3,643,004  2/1972  McKean........................ 174/110 PM
3,485,939  12/1969 Brown et al.................. 174/120 R X FOREIGN PATENTS OR APPLICATIONS
633,259  2/1962  Italy........................... 174/110 PM Primary Examiner—Bernard A. Gilheany
Assistant Examiner—A. T. Grimley
Attorney—Carothers and Carothers

[57] ABSTRACT

This invention relates to an insulated cable having an extruded strand shielding semi-conductive layer, and especially to an insulated cable which is characterized by using a blend of high density polyethylene and ethylene propylene rubber as the extruded strand shielding semi-conductive layer, the quantitative ratio of the high density polyethylene in the blend being 20 – 50 weight percent.

3 Claims, 1 Drawing Figure

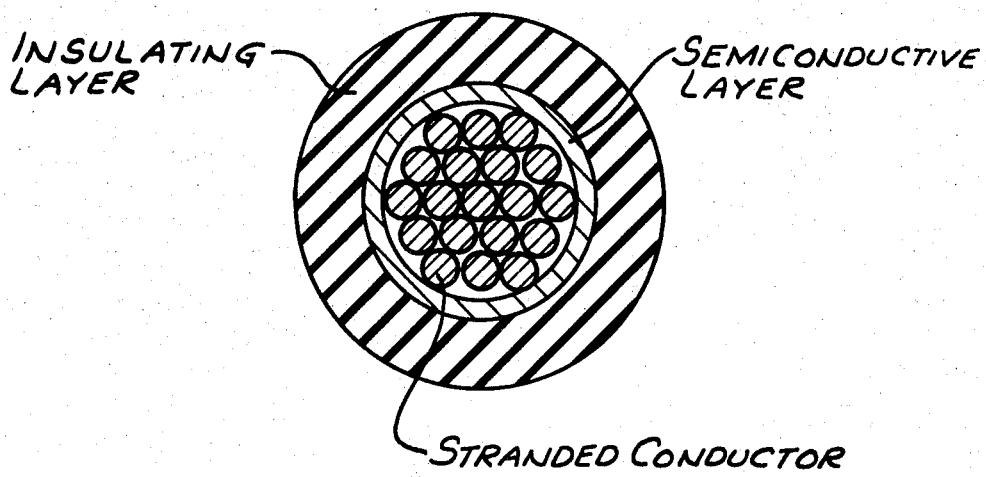

INSULATED CABLE HAVING STRAND SHIELDING SEMI-CONDUCTIVE LAYER

BACKGROUND OF THE INVENTION

This invention relates to an extruded strand shielding semi-conductive layer for plastic insulated cable.

In the customary plastics insulated cable which requires a needs strand shielding semi-conductive layer, a sufficient quantity of carbon-black is mingled in the layer to impart conductivity to the copolymer, which mainly consists of ethylene. Also, a cross-linking agent, anti-oxydant and processing-aid agent are blended into and extruded within the semiconductive layer to improve the strand shielding. Recently, in order to produce these kind of cable efficiently and with superior properties, double or triple extrusion i.e. extrusion of the strand shielding semi-conductive layer, extrusion of the insulating layer and extrusion of the insulation shielding semi-conductive layer etc., are usually performed by a continuous tandem process to produce the cable. In such a process, wherein extruded strand shielding semi-conductive materials with the above-mentioned blend are used, defects occur in that the inner semi-conductive layer to be extruded tends to clog the point of the extruder for the insulating layer due to its soft property, and more significantly, the boundary face between the extruded insulating layer and the extruded strand shielding semi-conductive layer becomes rough and extremely sharp edges are produced such that the breakdown voltage of the cable remarkably decreases.

In regard to these defects, the present inventors repeated various investigations, and as a result thereof, completed a composite for an extruded strand shielding semi-conductive layer which completely resolves all of the above-mentioned defects.

BRIEF DESCRIPTION OF THE DRAWING

The drawing is a cross sectional view of a cable showing the relationship of the semi-conductive blend of high density polyethylene and ethylene rubber to the stranded conductor and the outer insulating layer.

DETAILED DESCRIPTION OF THE INVENTION

This invention relates to insulated cable having an extruded strand shielding semi-conductive layer, consisting of polyethylene and cross-linked polyethylene which is extruded and coated. More particularly this invention provides an insulated cable with extremely superior electric breakdown characteristics by using this extruded strand shielding semi-conductive layer. This extruded strand shielding semi-conductive layer is characterized by blending 20–50 weight parts of high density polyethylene (polyethylene with a specific gravity above 0.930 at 20°C) with 80 – 50 weight parts of ethylene propylene rubber (EPM, EPDM etc.) per 100 weight parts of blend, and further mixing carbon black therein as a conductive material. This mixture is then extruded to coat the inner conductor. When it is necessary, of course, other cross-linking agents, anti-oxydants or processing-aid-agents may be blended in accordance with the conditions of cable use. As a result of the experiments performed by the present inventors, it was confirmed that quantity of the additions of carbon black (25 – 65 weight parts for 100 weight parts of base polymer), anti-oxydants, such as the amine group or the phenol group, and processing aid agents, such as Zinc stearate, and cross-linking agents have no influence on ultimate electric properties of the semi-conductive layer.

Practical examples and reference examples are shown in the following Table 1.

The materials and methods of testing used in this practice are as follows:

The strand shielding semi-conductive layer indicated in Table 1 was extruded on a conductor with strands having a 100 mm$^2$ cross-sectional area. In addition, the insulating layer identified in Table 1 was extruded on the layer by the continuous tandem process in order to coat it, then cross-linking reaction of the layer was completed by using saturated water vapor at a pressure of 15 atmospheres. (However in practical example 11, the cross-linking reaction was not performed.) Then, the electric properties (breakdown voltage) of cable were examined. The quality of the results are shown in Table 1 by the following symbols:

A: excellent
B: good
C: inferior

TABLE 1

| No. | Insulating layer | Strand shielding semiconductive layer base polymer | Cross-linking agent for semi-conductive layer | Electric characteristics |
|---|---|---|---|---|
| Ref. ex. 1 | Polyethylene specific gravity = 0.92<br>MI$^1$ = 2<br>DCP$^2$ = 2.5%<br>Anti-oxydant = 0.3% | EA$^3$ | None | C |
| Ref. ex. 2 | Do. | EA | DCP = 2% | C |
| Ref. ex. 3 | Do. | EVA$^4$ amount of Vinyl acetate = 5% | Do. | C |
| Ref. ex. 4 | Do. | EVA amount of Vinyl acetate = 10% | Do. | C |
| Ref. ex. 5 | Do. | EVA amount of Vinyl acetate = 20% | Do. | C |
| Ref. ex. 6 | Do. | EVA amount of Vinyl acetate = 30% | Do. | C |
| Ref. ex. 7 | Do. | EVA amount of Vinyl acetate = 40% | DCP = 2% | C |
| Ref. ex. 8 | Do. | EVA amount of Vinyl acetate = 20% | None | C |

TABLE 1—Continued

| No. | Insulating layer | Strand shielding semiconductive layer base polymer | | Cross-linking agent for semiconductive layer | Electric characteristics |
|---|---|---|---|---|---|
| Ref. ex. 9 | Do. | Polyethylene sp.gr.=0.92 MI=2 | | None | C |
| Ref. ex. 10 | Do. | Do. | | DCP=2% | C |
| Ref. ex. 11 | Do. | high density Polyethylene sp.gr.=0.96 | | None | B |
| Ref. ex. 12 | Do. | Do. | | DCP=1% | B |
| Ref. ex. 13 | Do. | Polypropylene | | None | B |
| Ref. ex. 14 | Do. | Ethylene propylene rubber (EP rubber) | | DCP=2% | B |
| Ref. ex. 15 | Do. | Butyl rubber | | Actor Q=0.5%[5] DM=1% | C |
| Ref. ex. 16 | Do. | High density polyethylene sp.gr.=0.96 EP rubber | (weight) 10% 90% | None | B |
| Prac. ex. 1 | Do. | High density polyethylene EP rubber | 20% 80% | Do. | A |
| Prac. ex. 2 | Do. | High density polyethylene EP rubber | 30% 70% | Do. | A |
| Prac. ex. 3 | Do. | High density polyethylene EP rubber | 40% 60% | Do. | A |
| Prac. ex. 4 | Do. | High density polyethylene EP rubber | 50% 50% | None | A |
| Prac. ex. 5 | Do. | High density polyethylene EP rubber | 40% 60% | X[6]=1.5 | A |
| Ref. ex. 17 | Do. | High density polyethylene EP rubber | 60% 40% | None | B |
| Ref. ex. 18 | Do. | High density polyethylene EP rubber | 80% 20% | Do. | B |
| Ref. ex. 19 | Do. | High density polyethylene Butyl rubber | 50% 50% | Do. | B |
| Ref. ex. 20 | Do. | Low density polyethylene EP rubber | 40% 60% | Do. | B |
| Ref. ex. 21 | Do. | Polypropylene EP rubber | 40% 60% | Do. | B |
| Prac. ex. 6 | Polyethylene sp.gr.=0.92 MI=4 DCP=2.5% anti-oxydant agent=0.3% | High density polyethylene EP rubber | 40% 60% | Do. | A |
| Prac. ex. 7 | talc of 30 weight parts is added to composite in practical example 6 of 100 weight part | Do. | | Do. | A. |
| Prac. ex. 8 | clay of 30 weight parts is added to composite in practical example 6 of 100 weight parts | Do. | | Do. | A |
| Prac. ex. 9 | EVA (amount of vinyl acetate=15%) MI=3 DCP=2.5% anti-oxydant=0.3% | Do. | | Do. | A |
| Prac. ex. 10 | talc of 30 weight parts is added to composite in practical example 9 of 100 weight part | Do. | | Do. | A |
| Prac. ex. 11 | polyethylene sp.gr.=0.92 MI=0.2 | Do. | | Do. | A |

Note:
[1] MI: melt-flow index (g/10mm)(ASTM–D–1238)
[2] DCP: di-α-cumyl peroxide
[3] EA: DPD–6169 (a DuPont trademark), UCC Co. Product, ethylene-ethylacrylate copolymer
[4] EVA: ethylene-vinylacetate copolymer
[5] Actor Q: p-Benzoquinone-dioxime
Actor DM: 2-Benzothiazolyl-disulfide which are (trademarks of Kawaguchi Chemical Co.)
[6] X: 2.5-dimethyl-2′,5′-di(tertiary class butyl peroxi)-hexene-3

As shown in the practical examples of Table 1, the objective cable which has superior breakdown voltage characteristic, can be obtained only when high density polyethylene and ethylene propylene rubber are blended at a certain ratio. When the weight percent of the high density polyethylene is below 20 or above 50, the breakdown voltage decreases in both cases. Accordingly, high a breakdown voltage can be obtained only when the weight percent of the high density polyethylene is in the range of 20 – 50. Furthermore, it was also found that when this combination is changed by using other polymers, good result can not be obtained.

As mentioned above, especially good results can be obtained only with a blend of high density polyethylene and ethylene propylene rubber, and only when the blending ratio is in the range of 20 – 50 percent of high density polyethylene weight percent. Also, the amount of carbon black included to impart the conductive property to the layer is not specifically defined, but when it is below 25 percent, the necessary conductivity for this application can not be obtained, and when it is above 75 percent, the processing properties of the blend become remarkably inferior. Accordingly it is preferable that it be in the range of 25 – 75 percent.

Furthermore, this invention, is of course also applicable to any cable having an insulating layer of polyethylene, cross-linked polyethylene or cross-linked polyethylene copolymer as the main constituent regardless of the size or use of the cable.

What we claim is:

1. An insulated cable having an extruded strand shielding semi-conductive layer adjacent an insulation composed primarily of a polymer selected from the group consisting of polyethylene, cross-linked polyethylene and polyethylene copolymer, said strand shielding semi-conductive layer comprising a blend of high density polyethylene and ethylene propylene rubber with the ratio of weight percent of high density polyethylene in the blend being in the range of 20 – 50 and an addition of conductive material.

2. The insulated cable of claim 1 wherein said conductive material is carbon black.

3. The insulated cable of claim 2 wherein the amount of said carbon black included in said blend is in the range of 27 – 75 percent.

* * * * *

UNITED STATES PATENT OFFICE
CERTIFICATE OF CORRECTION

Patent No. 3,749,817  Dated July 31, 1973

Inventor(s) Tetsuya Shiga; Yutaka Inagaki; Hironaga Matsubara

It is certified that error appears in the above-identified patent and that said Letters Patent are hereby corrected as shown below:

Col. 6, line 10, erase "27" and substitute --25--

Signed and sealed this 22nd day of January 1974.

(SEAL)
Attest:

EDWARD M. FLETCHER, JR.
Attesting Officer

RENE D. TEGTMEYER
Acting Commissioner of Patents